March 7, 1961 F. J. FONTEIN 2,974,068
PREPARING STARCH FROM BASIC MATERIALS
Filed Feb. 17, 1958 2 Sheets-Sheet 1

INVENTOR
FREERK J. FONTEIN

BY Cushman, Darby & Cushman
ATTORNEYS

March 7, 1961 F. J. FONTEIN 2,974,068
PREPARING STARCH FROM BASIC MATERIALS
Filed Feb. 17, 1958 2 Sheets-Sheet 2

INVENTOR
FREERK J. FONTEIN

BY Cushman, Darby + Cushman
ATTORNEYS

2,974,068
PREPARING STARCH FROM BASIC MATERIALS

Freerk J. Fontein, Heerlen, Netherlands, assignor to Stamicarbon N.V., Heerlen, Netherlands Filed Feb. 17, 1958, Ser. No. 715,631

Claims priority, application Netherlands Feb. 18, 1957

9 Claims. (Cl. 127—67)

The invention relates to starch preparation and more particularly to a process of preparing starch from basic materials such as potatoes, cassava roots and the like, by which a starch suspension containing the starch particles and impurities is purified.

In this purification process, which may be carried out in various ways, the impurities are separated from the starch and the suspension is thickened. Impurities are entrained by the freed water so that ultimately a pure and thickened starch is left. The shape of the particles play an important role in the process. Generally, the purification should be visualized as a process of separating particles of a given specific gravity, which on the whole deviate considerably from the globular shape (the impurities), from particles of a somewhat higher specific gravity, which are more or less globular (the starch grains), and it will be clear therefore that particle size and specific gravity are the criteria on which the separation is made.

The size of potato starch particles, for example, varies from 10 to 100μ while the impurities may be in the same size range or larger, for example, anything up to 150μ and over, depending on the particle size to which the potatoes are grated. Since the settling velocity of the particles with respect to water plays a part in the separation, the danger exists that coarser impurities will join the fine starch particles and that the discharging impurities will entrain part of the finer starch particles.

The introduction of hydrocyclones has greatly improved the technique of potato starch preparation. Using these hydrocyclones, a good separation yielding pure starch and starch-free impurities can be made in an adequate way without incurring appreciable losses of starch.

It has been suggested that the suspension, after freeing it from the coarsest impurities, be thickened by passing it through one or several hydrocyclone thickeners in which process a fraction containing the very fine impurities is separated off from the overflow. The maximum dimension of these very fine impurities is substantially intermediate between the minimum and maximum dimensions of the starch particles. The apex fraction obtained from these hydrocyclone thickeners, which is composed substantially of the starch and the remaining impurities, is purified further, for example, in a number of hydrocyclones connected in series, multiple hydrocyclones being preferred for this purpose.

The overflow fraction from the washing stages, which does not contain coarse starch, is freed from impurities by passing it over a fine-mesh screen (see e.g. "De Ingenieur," 1953, No. 44, Ir. F. J. Fontein, "Hydrocyclones for Recovery of Solid Particles; Applications in the Foodstuff Industry"). If the thickened suspension which, as stated above, has been purified already of the finest impurities, is to be completely purified by passing it through hydrocyclones and leading the overflow fraction from the hydrocyclones over fine-mesh screens, it follows from what has been stated above about this separation process, that the overflow fraction issuing from the hydrocyclone will contain a great many starch particles in addition to the above mentioned impurities, which requires the fraction to be recycled. The installation for such process requires considerable apparatus.

Accordingly, an object of the present invention is the provision of a process which greatly simplifies the above procedure.

According to the invention at least one intermediate fraction, substantially containing particles the largest of which are of the same size as or larger than the largest starch particles and the smallest of which are intermediate between the largest and the smallest starch particles, is screened off from the suspension from which the coarsest impurities considerably larger than the largest starch particles have been previously removed by screening if so desired, the intermediate fraction being subsequently supplied to an apparatus to be separated into substantially pure coarse starch and substantially all of the impurities supplied to the apparatus.

This process offers the advantage that the purification of the fraction containing particles differing in specific gravity and having dimensions varying within fairly narrow limits, may be realized in a simpler way. Removing the intermediate fraction is done by leading the suspension across at least two screening devices, preferably sieve bends, the screening sizes of which determine the smallest and largest dimensions of the particles occurring in the said intermediate fraction.

The term sieve bend as herein used is understood to be a stationary screening device having a flat or cylindrical screening deck. A flat sieve bend is provided with means for feeding the material to be treated in a thin layer along and parallel to the screening deck, the screening deck being provided with openings the dimensions of which, measured in the direction of flow, are smaller than, or at most equal to those measured perpendicular to the direction of flow. The screening deck of the curved sieve bend has openings the dimensions of which, measured perpendicular to the generatrices of the screening deck, are smaller than or at most equal to those measured along the generatrices; the device being fitted furthermore with means for feeding the liquid, together with the solid particles contained in it, tangentially to the concave side of the screening deck and perpendicularly to the generatrices thereof, the feed rate being such as to ensure that the particles, in moving from the feed end to the discharge end of the screening deck, will travel in a direction substantially perpendicular to the generatrices. The sieve bend has the advantage of offering the possibility to screen at a very small size without danger of blockages.

When employing the measures according to the invention there are also separated off two fractions one of which consists substantially of particles smaller than the smallest screening size, the other one being composed substantially of impurities larger than the largest screening size. For this reason it is preferred to choose the largest screening size only slightly greater than the dimensions of the largest starch particles. The term screening size is understood to be the size at which the separation is made, which, in cases where sieve bends are being used, is considerably smaller than the width of the slots between the bars of the sieve bends or the dimensions of the openings in the screening deck.

Using procedure by which, as mentioned above, the suspension is first thickened in a thickener station where at least that part of the impurities the largest of which are intermediate between the largest and the smallest starch particles is substantially removed from the suspension, it is preferred according to the invention to carry out the removal of the intermediate fraction (preceded if necessary by dilution of the thickened suspension), immediately after a thickening treatment, the smallest screening size in that case being smaller than or at most equal to the smallest dimension of the impurities which for the greater part are still present in the suspension. Thus, the fraction screened off at the smallest screening size will contain no fine impurities or only very few fine impurities and these may be easily discharged with the liquid when said fraction is being thickened.

It is also possible, however, to screen the intermediate fraction immediately after it has left the grinding station. The grinding station, where the potatoes or roots are grated to the size desired, may obviously comprise screens by means of which the coarsest impurities considerably larger than the largest potato starch grains are removed from the suspension. In some instances, it may be advantageous to screen off the intermediate fraction in two stages or more, in which case the intermediate fraction coming from each stage is separated in an allied installation yieding a pure starch fraction and a fraction containing the impurities supplied. This latter fraction may still contain some of the finer starch particles. The installation in which the separation between starch particles and impurities takes place may comprise a classifying apparatus, for example, one or more hydrocyclones, preferably multiple hydrocyclones.

According to the invention the fraction or fractions separated off in the classifying apparatus, which contain substantial impurities, are freed of starch still present therein, by screening. This may be achieved since the starch particles present in the fraction or fractions are considerably smaller than the impurities.

In cases where the intermediate fraction is separated off from the suspension immediately after the grinding station, the fraction that has passed through the screening plant with the smallest screening size should, according to the invention, be thickened in a thickener station to be separated there into a fraction containing pure starch and another one containing the impurities. According to the invention the smallest screening size is less than the dimensions of the impurities which in the thickener station would not get into the overflow. The fraction separated off from the intermediate fraction, which is composed substantially of pure starch, is fed to the thickener station treating the underflow from the screening plant with the finest screening size.

According to the invention part of the starch particles separated off by screening, which particles were contained in the overflow fractions of the said classifying apparatus, may be supplied to one of the thickener stations. In cases where the intermediate fraction is separated off from the suspension coming from a thickener station, said part of the starch particles isolated by screening will preferably be recycled to the thickener station.

The invention may best be understood with reference to the accompanying drawings wherein three illustrative embodiments are shown.

Figure 1:
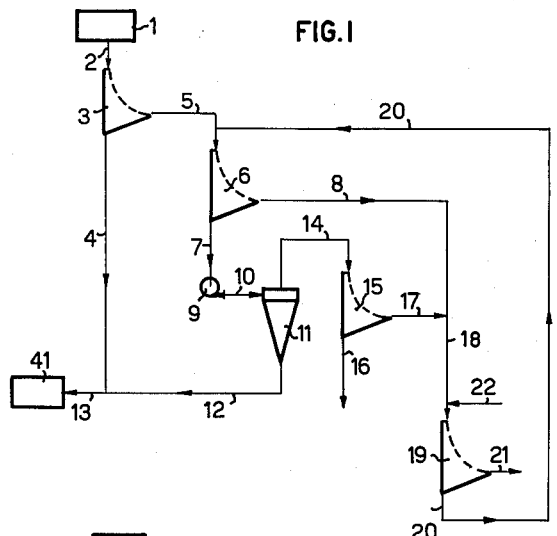
Figure 1 is a schematic view illustrating in flowsheet form apparatus of a potato starch factory for carrying out the principles of the present invention.

Referring now more particularly to Figure 1 of the drawings, the apparatus includes a thickener station indicated at 1, which may comprise one or several hydrocyclones, the overflow of which is arranged to discharge the finest impurities and liquid. The underflow from the thickener is collected and led through a conduit 2 to a sieve bend 3. A conduit 4 receives the underflow from the sieve bend and the overflow is collected and led through a conduit 5 to a second sieve bend 6. Conduits 7 and 8 receive the underflow and overflow respectively from the sieve bend 6, the conduit 7 being connected to the inlet side of pump 9. Connected to the outlet of the pump 9 is a conduit 10 which feeds into a classifying apparatus 11, as, for example, one or several hydrocyclones, preferably multiple hydrocyclones.

The apex fraction of the hydrocyclone 11 discharges into a conduit 12 which is connected together with the conduit 4 to a conduit 13 leading to a thickener station, indicated at 41. A conduit 14 receives the overflow fraction from the hydrocyclone 11 and feeds the same to a third sieve bend 15, the underflow of which discharges into a conduit 16.

The overflow from the sieve bend 15 is received by a conduit 17 which, together with the conduit 8, is connected with a conduit 18. A conduit 22 connected to a source of water (not shown) is connected with the pipe 18 to supply a fourth sieve bend 19, the overflow of which discharges into a conduit 21. The underflow from the sieve bend 19 discharges into a conduit 20 which is connected to the conduit 5 to supply the sieve bend 6.

After being diluted if so desired, the thickened suspension from the thickener 1, containing, for example, potato starch in the size range 10–100μ and impurities larger than say 60μ, is carried to sieve bend 3 via conduit 2. The width of the slots in the sieve bend 3 are so chosen as to enable it to screen at 60μ. A pure starch suspension containing starch particles of less than 60μ and being free, or substantially free, of impurities is fed into thickener station 41 along the conduits 4 and 13. The overflow fraction coming from sieve bend 3 contains all the impurities larger than 60μ, substantially all starch particles above 60μ and starch particles smaller than 60μ that have been left behind. This overflow fraction is supplied to sieve bend 6 along conduit 5 with water added if desired. The width of the slots in the sieve bend 6 are so chosen as to make it separate at 120μ. The underflow from this sieve bend, which contains the separated intermediate fraction, is composed substantially of starch particles in the size range 60–100μ, few starch particles of 10–60μ and impurities of 60–120μ. The overflow from sieve bend 6 contains substantially impurities larger than 120μ plus traces of starch particles contained in the liquid. The underflow from sieve bend 6 is pumped by the pump 9 through conduits 7 and 10 to the hydrocyclone or multiple hydrocyclone 11 which separates in such a way as to yield an apex discharge fraction consisting of pure starch measuring 60–100μ in size, which is carried to thickener station 41 along conduits 12 and 13. Conduit 13 therefore discharges pure starch of 10 to 100μ in size. The overflow fraction leaving the hydrocyclone and containing the impurities of 60μ to 120μ together with the starch particles smaller than 60μ that have been entrained by the liquid, flows along conduit 14 and is passed again across sieve bend 15 which screens at 60μ. The underflow from the sieve bend 15 containing the starch particles smaller than 60μ, are carried off through conduit 16 and the overflow fraction containing the impurities between 60μ and 120μ are discharged along conduit 17.

Starch particles smaller than 60μ that may have been left in the overflow fraction coming from sieve bends 6 and 15 is removed by leading the fraction, with water added through conduit 22, to sieve bend 19 which screens at 60μ. The starch discharged along pipe 16 is preferably returned to the thickener station 1 because this material has become diluted too much, whereas the underflow from sieve bend 19, which contains only very few starch particles below 60μ, is recycled to sieve bend 6 along conduit 20. The impurities are carried off through conduit 21. If the amount of starch in the overflow from the sieve bend 6 is negligible, this fraction may be discharged directly.

Figure 2:
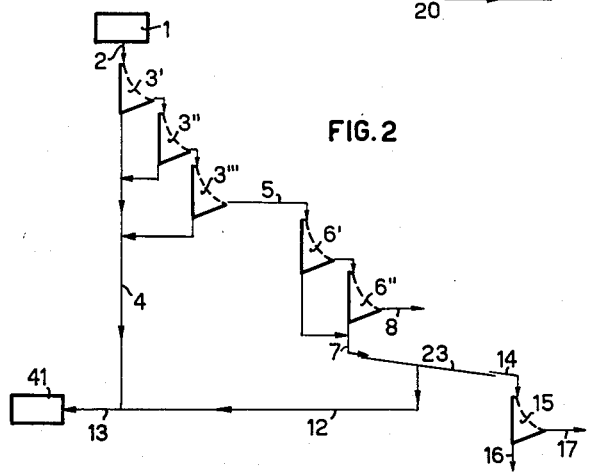
Figure 2 is a view similar to Figure 1 illustrating a modified form of apparatus.

The embodiment shown in Fig. 2 substantially corresponds with the one represented in Fig. 1. A starch suspension of about 6° Bé., which contains hardly any albumen, is discharged into conduit 2. The concentration is 100 g./l. In other words, when the quantity of starch supplied amounts to 100 t./h., 100 m.³ of suspension have to be handled hourly. The sieve bend 3 is replaced by three sieve bends 3', 3" and 3''', which are arranged in series, each screening at 60μ and having a capacity of 100 m.³/h. The suspension is washed on sieve bends 3" and 3''' where wash water is added to it. The sieve bend 6 is replaced by two sieve bends 6' and 6" which screen at 120μ. Also, on the latter sieve bends, extra wash water is supplied, the conduits for feeding the wash liquid to the sieve bends not being shown in the drawing. The underflow from these sieve bends, which constitutes the separated intermediate fraction, is passed along conduit 7—and, if necessary, through a thickener station (not shown)—to a table 23 where the suspension is separated into pure starch, which is carried away to thickener station 41 along conduit 12, and impurities ranging between 60μ and 120μ in size, plus starch particles below 60μ which along conduit 14 are supplied to sieve bend 15 to be screened there at 60μ.

Figure 3:
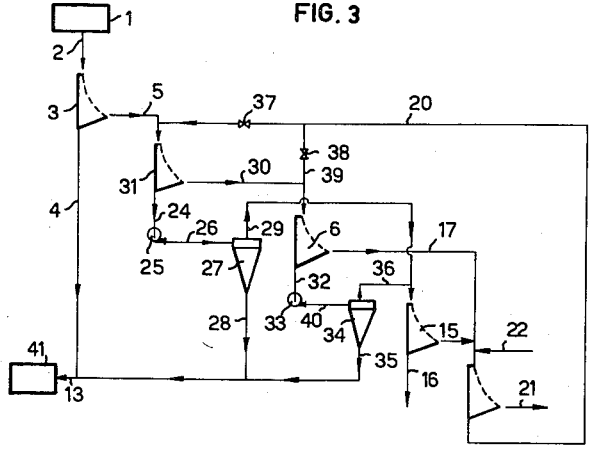
Figure 3 is a view similar to Figure 1 illustrating still another modified form of apparatus.

In the alternative arrangement shown in Fig. 3, the intermediate fraction is screened off in stages, on sieve bend 3 at 60μ, on a sieve bend 31 at 80μ and on the sieve bend 6 at 120μ. Here again, the underflow from sieve bend 3 contains exclusively starch particles smaller than 60μ, while the underflow fraction from the sieve bend 31 contains starch particles of 60–80μ and impurities in the same size range in addition to a small amount of starch particles below 60μ. This underflow fraction is passed along a conduit 24, by a pump 25 and through a conduit 26 to a hydrocyclone 27 and separated there into a pure starch fraction of 69–80μ which, along a conduit 28, is supplied to the thickener station 41, and a fraction containing impurities of 60–80μ and starch particles smaller than 60μ. This fraction is supplied to the sieve bend 15 along conduit 29. The overflow fraction from the sieve bend 31, containing substantially starch particles of 80–100μ, impurities above 80μ and a small amount of starch particles below 60μ, is diluted with liquid, supplied along a conduit 39 and then fed to the sieve bend 6. The underflow from this sieve bend contains substantially starch particles of 80–100μ and impurities of 80–120μ.

Impurities larger than 120μ are carried away through the conduit 17. The underflow from sieve bend 6 is passed through conduits 32, 40 by a pump 33 to a hydrocyclone 34 and separated there into a pure starch fraction and a fraction containing the impurities. The two fractions are carried away along conduits 35 and 36 respectively. If desired, the overflow fraction from hydrocyclone 27 may be supplied, either in whole or in part, to sieve bend 6, in which case conduit 39 may be dispensed with. Conduits 20 and 39 include valves 37 and 38 for controlling the supply of liquid to sieve bends 31 and 6.

In the present invention it is of importance that the screening on the first screen be adapted to the largest dimension of the very fine impurities which in the thickener station are extracted from the suspension to be thickened. Screening at a larger particle size would require that the underflow from the first screen, which ought to contain nothing but starch, also includes part of the impurities. Screening at a smaller size would cause screen 6 and hydrocyclone 11 to become overloaded. The screening on screen 6 should likewise be adapted to the size of the largest starch particle so as to ensure that as few as possible of the impurities larger than said starch particles will get into the intermediate fraction.

The process according to the invention permits of many alternatives. For example, it is possible to screen the thickened suspension first on the 120μ sieve bend, carrying its underflow to the 60μ sieve bend, and passing the overflow fraction from the latter sieve bend, after diluting it, if so desired, through the hydrocyclone. Figs. 1–3 remain applicable in cases where the very coarse impurities are screened off from the suspension and the intermediate fraction is removed immediately afterwards. Thickener station 1 may then be omitted and a suspension which, in addition to the starch particles in the size range 10–60μ, contains impurities ranging from 10 to 60μ, is carried towards thickener station 41 through conduit 4.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A process for preparing starch from basic starch containing materials by which a suspension containing starch particles and impurities is purified which comprises the steps of screening the suspension to obtain at least one intermediate fraction substantially containing particles the largest of which are at least of the same size as the largest starch particles and the smallest of which are of a size intermediate between the largest and smallest starch particles, and then separating by settling rate said intermediate fraction into a substantially pure coarse starch fraction and a fraction containing substantially the impurities contained in said intermediate fraction.

2. A process as defined in claim 1 wherein the suspension is thickened prior to said screening operation to remove from the suspension at least that part of the impurities the largest of which are intermediate in size between the largest and smallest starch particles and the screen is carried out immediately after the thickening treatment, the smallest screening size in the screening treatment being at most equal to the smallest size of the impurities which are still substantially present in the suspension.

3. A process as defined in claim 1 wherein said screening is carried out in at least two stages, the intermediate fraction obtained from each stage being subsequently separated into a pure starch fraction and a fraction containing substantially the impurities in the associated intermediate fraction.

4. A process as defined in claim 1 wherein the impurity containing fraction is further screened to obtain any starch particles remaining therein.

5. A process as defined in claim 1 wherein the suspension is prepared by a grinding treatment immediately prior to said screening.

6. A process as defined in claim 5 wherein an undersize fraction is also obtained in said screening operation, said undersize fraction being thickened to separate the same into a fraction containing pure starch and a fraction containing the impurities.

7. A process as defined in claim 6 wherein the screening operation is such that the particle size of the impurities in said undersize fraction is less than the particle size of the impurities which would not be discharged in the overflow during the thickening operation.

8. A process as defined in claim 1 wherein an undersize fraction is also obtained in said screening operation, said undersize fraction being subsequently thickened in a thickener station.

9. A process as defined in claim 8 wherein the impurity containing fraction is further screened to obtain a fraction of residual starch which is subsequently thickened.

References Cited in the file of this patent

UNITED STATES PATENTS

| | | |
|---|---|---|
| 2,013,668 | Peltzer | Sept. 10, 1935 |
| 2,310,651 | Peltlzer | Feb. 9, 1943 |
| 2,316,807 | Peltzer | Apr. 20, 1943 |
| 2,556,322 | Eckers | June 12, 1951 |
| 2,599,619 | Eckers | June 10, 1952 |
| 2,760,889 | Peltzer | Aug. 28, 1956 |
| 2,772,990 | Hage | Dec. 4, 1956 |
| 2,778,752 | Vegter | Jan. 22, 1957 |
| 2,798,011 | Fontein | July 2, 1957 |